(12) United States Patent
Ishihara et al.

(10) Patent No.: US 8,763,467 B2
(45) Date of Patent: Jul. 1, 2014

(54) PRESSURE SENSOR DEVICE

(75) Inventors: Takuya Ishihara, Tokyo (JP); Hidefumi Harada, Tokyo (JP); Masashi Sekine, Tokyo (JP)

(73) Assignee: Azbil Corporation, Tokyo (JP)

( * ) Notice: Subject to any disclaimer, the term of this patent is extended or adjusted under 35 U.S.C. 154(b) by 282 days.

(21) Appl. No.: 13/419,543

(22) Filed: Mar. 14, 2012

(65) Prior Publication Data

US 2012/0247216 A1   Oct. 4, 2012

(30) Foreign Application Priority Data

Mar. 31, 2011   (JP) ................... 2011-078478

(51) Int. Cl.
  *G01L 9/12*  (2006.01)
  *G01L 9/00*  (2006.01)
(52) U.S. Cl.
  CPC ................ *G01L 9/12* (2013.01); *G01L 9/0044* (2013.01)
  USPC .......................................................... 73/708
(58) Field of Classification Search
  CPC ... G01L 9/0073; G01L 9/0072; G01L 9/0075; G01L 9/0042; G01L 19/04; G01L 9/12; G01L 9/0047; G01L 9/0052; G01L 9/0054; G01L 13/025; G01L 15/00; G01L 19/0084; G01L 19/0636; G01L 19/0092; G01L 19/148; G01L 21/22
  USPC .................................................... 73/700–756
  See application file for complete search history.

(56) References Cited

U.S. PATENT DOCUMENTS

| 6,789,415 | B1 | 9/2004 | Kaiser et al. |
| 2003/0019299 | A1* | 1/2003 | Horie et al. ..................... 73/718 |
| 2008/0282806 | A1* | 11/2008 | Chakraborty ................... 73/718 |
| 2012/0017691 | A1* | 1/2012 | Ishihara et al. ................. 73/724 |
| 2013/0248024 | A1* | 9/2013 | Dunn et al. .................... 137/551 |

FOREIGN PATENT DOCUMENTS

| JP | 2002-542107 A | 12/2002 |
| JP | 2007-155500 A | 6/2007 |

OTHER PUBLICATIONS

Korean Office Action, dated Apr. 29, 2013, which issued during the prosecution of Korean Patent Application No. 10-2012-0013266, which corresponds to the present application.

* cited by examiner

*Primary Examiner* — Andre Allen
(74) *Attorney, Agent, or Firm* — Troutman Sanders LLP

(57) ABSTRACT

A pressure sensor device has a sensor detecting pressure of a gas that is introduced from the outside, a heater for heating the sensor, a package containing the sensor and the heater, a circuit portion producing an output signal that represents the pressure of the gas based on the detection output detected by the sensor, and a circuit containing portion containing the circuit portion. The package and the circuit containing portion are structured from separate cases and are disposed separately with a connecting structural member interposed therebetween. The connecting structural member 90 includes electrode lead pins connecting between the sensor within the package and the circuit portion within the circuit containing portion, insulated pipes for covering the outer peripheries of the electrode lead pins, and coil springs covering the outer peripheries of the insulated pipes.

3 Claims, 3 Drawing Sheets

PRESSURE SENSOR DEVICE

CROSS REFERENCE TO RELATED APPLICATIONS

The present application claims priority under 35 U.S.C. §119 to Japanese Patent Application No. 2011-078478, filed Mar. 31, 2011, which is incorporated herein by reference.

FIELD OF TECHNOLOGY

The present invention relates to a pressure sensor device, and, in particular, relates to a pressure sensor device having a diaphragm structure that is suited to measuring pressures at near vacuum, and structured so that the sensor can be operated at high temperatures.

BACKGROUND

Conventionally, electrostatic capacitance-type pressure sensor devices for measuring vacuum levels in vacuum chambers have been used in manufacturing equipment such as plasma etching equipment and sputtering equipment for manufacturing semiconductors. Depending on the type of the pressure sensor device, the sensor portion may malfunction due to changes in the amount of flexure due to material adhered to the diaphragm face. Because of this, a structure wherein the sensor portion is placed at a high temperature has been proposed in order to prevent such malfunctions (See, for example, Japanese Unexamined Patent Application Publication 2007-155500 ("JP '500")).

Here, the conventional pressure sensor as set forth in JP '500 is provided with an electrostatic capacitance-type sensor for sensing the pressure of a gas in an external chamber, a heater for heating the sensor to a specific operating temperature, a circuit portion fir generating an output signal indicating the pressure of the gas in the external chamber from a capacitance value sensed by the sensor, and a case for containing the sensor, heater, and circuit portion. Moreover, the case in such a conventional pressure sensor has a sensor containing portion for containing the sensor and the heater, a circuit containing portion for containing the circuit portion, and a thermal propagation preventing portion for partitioning between these containing portions and for preventing the propagation of the heat, produced by the heater, to the circuit containing portion.

However, because the conventional pressure sensor set forth in JP '500 has the sensor containing portion and the circuit containing portion both provided within the same case, a complex thermal insulating structure and heat dissipating structure are needed within the case, increasing the cost. Moreover, the use of a heater for high temperatures in excess of 400° C. makes it necessary to secure an adequate distance between the sensor containing portion and the circuit containing portion within the case, increasing the size of the case concomitantly.

Given this, in order to solve such problems, means have been considered wherein the sensor and the circuit portion are contained in separate cases and separated, connected by a cable, or the like.

However, when the sensor and the circuit portion are connected simply by a cable, the end portion that is connected to the sensor, in particular, may be placed under tension during the connection operation, and there is a risk that it may not be able to withstand high temperatures in excess of 400° C., and a potential that adequate electromagnetic shielding might not have been added. Because of this, there has been the need for new proposals for superior connecting means, in terms of thermal durability, mechanical strength, electromagnetic shielding, and the like, when the sensor and the circuit portion are separated by being enclosed in separate cases.

The present invention is a result of contemplation on this situation, and the object thereof is to increase the thermal durability, the mechanical strength, and the electromagnetic shielding of a structural member that connects between the sensor and the circuit portion in a pressure sensor device that is structured so that the sensor will be put to a high temperature (of for example, about 300 to 450°C.).

SUMMARY

The pressure sensor device according to examples of the present invention include a sensor for detecting a pressure of a gas that is introduced from the outside, a heater for heating the sensor to a specific operating temperature, a package for containing the sensor and the heater, a circuit portion for producing an output signal that represents the pressure of the gas, based on the detection output detected by the sensor, and a circuit containing portion for containing the circuit portion, wherein: the package and the circuit containing portion are structured from separate cases and are disposed separately with a connecting structural member interposed therebetween; and the connecting structural member has a conductive line for connecting between the sensor within the package and the circuit portion within the circuit containing portion, an insulated member for covering the outer periphery of the conductive line, and an elastic member for covering the outer periphery of the insulated member.

When this structure is used, the package (the sensor containing portion) and the circuit containing portion are structured from separate cases and disposed separately, thus eliminating the need for special thermal insulating and heat dissipating structures within the device, which have been required in the conventional integrated pressure sensor device, and enabling flexible installation of the package and the circuit containing portion depending on the environment of the work area. Moreover, the connecting structural member that connects the package and the circuit containing portion comprises a conductive line for connecting the sensor within the package and the circuit portion within the circuit containing portion, an insulating member for covering the outer periphery of the conductive line, and an elastic member for covering the outer periphery of the insulating member, and thus has high mechanical strength and elasticity. Moreover, the connecting structural member functions also as a heat dissipating member and as an electromagnetic shield member. Consequently, this enables excellent mechanical strength, thermal durability, and electromagnetic shielding despite having a simple structure, enabling an improvement in the reliability of the pressure sensor device.

The insulating member may be structured by stacking a plurality of pipe-shaped members, made from an insulating material, in the lengthwise direction of the conductive line.

When this structure is used, the flexibility of the connecting structural member can be increased substantially through structuring the insulating member by stacking a plurality of pipe-shaped members, made from insulating material, in the lengthwise direction of the conductive line. Moreover, stacking the plurality of pipe-shaped members makes it possible to form a connecting structural member of an arbitrary length.

Moreover, in the present pressure sensor device, the elastic member may be structured from a coil spring.

When this structure is used, the elastic member is structured from a coil spring, simplifying device manufacturing.

The examples of the present invention enable an increase in the thermal durability, the mechanical strength, and the electromagnetic shielding of a structural member for connecting a sensor to a circuit portion in a pressure sensor device structured so that the sensor will be operated at a high temperature.

DETAILED DESCRIPTION

In the below, examples wherein the present invention is applied are explained in detail while referencing the drawings.

Figure 1:
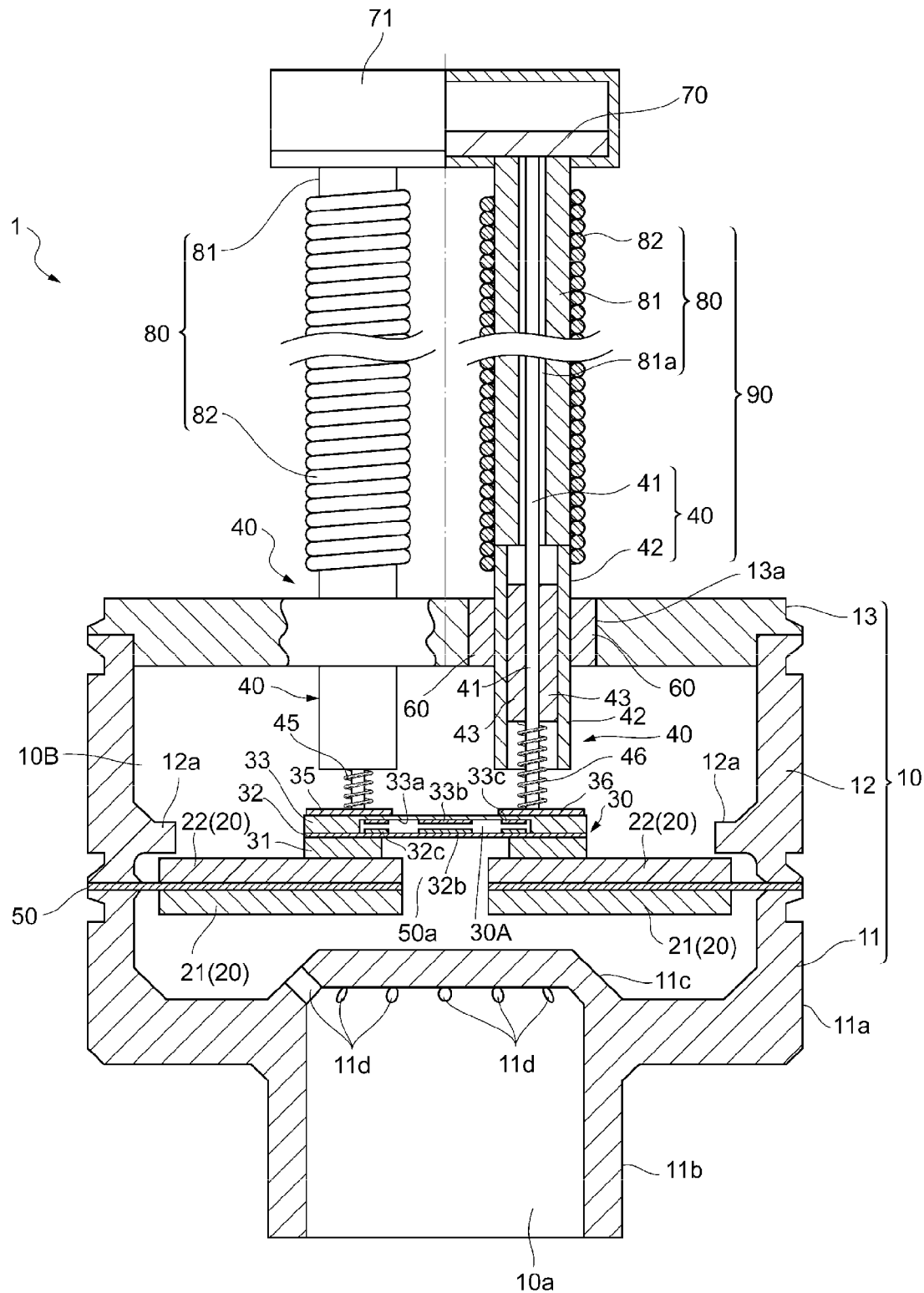
FIG. 1 is a cross-sectional diagram of a pressure sensor device according to an example of the present invention.

First FIG. 1 is used to explain a pressure sensor device 1 according to an example. The pressure sensor device 1 according to the present example, as illustrated in FIG. 1, includes: a package 10, a pedestal plate 20 that is contained within the package 10, a sensor 30 that is connected to the pedestal plate 20, similarly within the package 10, a plurality of electrode lead portions 40 for connecting conductively to the outside of the package 10, connected directly to the package 10, and a circuit portion 70 for generating an output signal that indicates the pressure of a gas based on the detected output, detected by the sensor 30. Moreover, the pedestal plate 20 is separate from the inner wall of package 10, supported on the package 10 only through a support diaphragm 50.

The package 10 is structured from a lower housing 11, an upper housing 12, and a cover 13. The lower housing 11 and the upper housing 12 are structured from Inconel®, which is a corrosion-resistant metal, and the cover 13 is structured from Kovar® that has a coefficient of thermal expansion that is near to that of glass, and these are bonded together through welding. Note that a heater (not shown) for heating a sensor 30 is disposed within the package 10.

The lower housing 11 is a member that is provided with a shape that connects cylindrical members having different diameters, where a large diameter portion 11a thereof has a portion that connects to a support diaphragm 50, and a small diameter portion 11b thereof forms a pressure inlet portion 10A into which the fluid to be measured flows. Note that a baffle 11c is formed at the connecting portion between the large diameter portion 11a and the small diameter portion 11b, where pressure inlet holes 11d are formed at specific intervals in the circumferential direction in the periphery of the baffle 11c. The baffle 11c fulfills the role of causing the fluid to be measured, such as a process gas, from the pressure inlet portion 10A, to follow a circuitous route rather than arriving directly at the sensor 30, described below, to prevent the deposition of process gas components or impurities within the process gas onto the sensor 30.

The upper housing 12 is a member that has an essentially cylindrical shape, and forms a reference vacuum chamber 10B for a vacuum within the package 10, together with the cover 13, the support diaphragm 50, the pedestal plate 20, and the sensor 30. The reference vacuum chamber 10B is separated by the sensor 30 from the region into which the process gas is introduced (the pressure inlet portion 10A). A gas adsorbing substance, known as a getter (not shown), is disposed in the reference vacuum chamber 10B, to maintain the vacuum level. Moreover, a stopper 12a is formed protruding at an appropriate location in the circumferential direction on the side of the upper housing 12 wherein the support diaphragm is attached. The stopper 12a fulfills the role of suppressing excessive dislocation of the pedestal plate 20 due to sudden increases in pressure of the fluid to be measured.

The cover 13 is a plate-shaped member that looks like a circle when viewed from above, and has a specific thickness, where a plurality of electrode lead through holes 13a is formed in the center portion thereof. Electrode lead portions 40 are embedded in the electrode lead through holes 13a, where the gaps between the electrode lead portions 40 and the electrode lead through holes 13a are sealed airtightly through a hermetic seal portion 60 that is formed from sealing glass.

The support diaphragm 50 is made from a thin plate of Inconel®, having an exterior shape matching the shape of the package 10, where a peripheral edge portion is bonded, through welding, or the like, held between the edge portions of the lower housing 11 and the upper housing 12, described above. The thickness of the support diaphragm 50 is, in the case of the present example, several tens of micrometers, and is sufficiently thinner than each of the pedestal plates 21 and 22. Additionally, a pressure introducing hole 50a, for introducing pressure into the pressure sensor 30, is formed in the center part of the support diaphragm 50. A thin ring-shape lower pedestal plate (first pedestal plate) 21 and an upper pedestal plate (second pedestal plate) 22, made out of sapphire, which is a single-crystal aluminum oxide crystal, are bonded to both sides of the support diaphragm 50 around the entirety in the peripheral direction, at positions somewhat separated from the bonding portion of the support diaphragm 50 and the package 10.

The pedestal plates 21 and 22 are adequately thick, as described above, relative to the thickness of the support diaphragm 50, and are structured so as to hold the support diaphragm 50 in a so-called "sandwich shape" between the two pedestal plates 21 and 22. Doing so prevents warping of this part due to thermal stresses that are produced through a difference in the coefficients of thermal expansion of the pedestal plate 20 and the support diaphragm 50. Additionally, the sensor 30, made from sapphire, which is a single-crystal aluminum oxide crystal, and having a square shape when viewed from above, is bonded to the upper pedestal plate 22, it is bonded through a bonding material that is an aluminum oxide base.

The sensor chip 30: a spacer 31, made out of a thin plate that has a square shape, when viewed from above, with a size of no more than 1 $cm^2$; a sensor diaphragm 32 wherein a deformation occurs in accordance with the application of a pressure, bonded to the spacer 31; and a sensor pedestal 33 that forms a vacuum capacitor chamber (a reference chamber) 30A through being bonded to the sensor diaphragm 32. Additionally, the vacuum chamber 30A for the vacuum and the reference vacuum chamber 10B maintain an essentially identical vacuum level for both through a connecting hole, not shown, penetrating through an appropriate location of the sensor pedestal 33. Note that the spacer 31, the sensor diaphragm 32, and the sensor pedestal 33 are bonded to each other through so-called direct bonding, to structure an integrated sensor 30.

Moreover, stationary electrodes 33b and 33c are formed out of a conductor such as gold or platinum, or the like, in the recessed portion 33a of the sensor pedestal 33, and movable electrodes 32b and 32c are formed out of a conductor such as gold, platinum, or the like, on the front face of the sensor diaphragm 32, which faces the stationary electrodes, in the capacitor chamber 30A of the sensor 30. Moreover, contact pads 35 and 36 are formed from gold or platinum on the top face of the sensor 30, and the stationary electrodes 33b and 33c and the movable electrodes 32b and 32c are connected by interconnections, not shown, to the contact pads 35 and 36.

Each electrode lead portion 40 is provided with an electrode lead pin 41 and a metal shield 42. The center portion of the electrode lead pin 41 is embedded in a hermetic seal portion 43, made from an insulating material such as glass, at the metal shield 42, to maintain an airtight state between the two ends of the electrode lead pin 41. One end of the electrode lead pin 41 is connected electrically to the sensor 30. The other end of the electrode lead pin 41 is exposed to the outside of the package 10 through a through hole 13a of the cover 13, and is connected to the circuit portion 70. Note that, as described above, the hermetic seal portion 60 is interposed between the shield 42 and the cover 13. Contact springs 45 and 46, which are electrically conductive, are connected to one end of the electrode lead pin 41. The contact springs 45 and 46 have adequate flexibility so that even if the support diaphragm 50 were to be dislocated slightly through a violent increase in pressure through a sudden inflow of the fluid to be measured, such as a process gas, or the like, from the pressure inlet portion 10A, still the biasing force of the contact springs 45 and 46 would prevent a negative impact on the measurement accuracy.

The circuit portion 70 is structured from one or more circuit boards, and is contained within the circuit containing portion 71. In the present form of embodiment, as illustrated in FIG. 1, the package 10, as the sensor containing portion that contains the sensor 30 and the circuit containing portion 71 that contains the circuit portion 70 are structured from separate cases. Moreover, the package 10 and the circuit containing portion 71 are disposed separated by a connecting structural member 90 that has a specific length. The length of this connecting structural member 90 (the distance between the package 10 and the circuit containing portion 71) can be set as appropriate depending on the sizes of the package 10 and of the circuit containing portion 71, the heated temperature of the sensor 30, the situation in which the pressure sensor device 1 is disposed, and so forth.

The connecting structural member 90 is structured from the electrode lead portions 40, and an extension shield portion 80 that is connected to the electrode lead portions 40. The electrode lead portions 40, as described above, have electrode lead pins 41 and metal shields 42. The electrode lead pins 41 are electrically conductive lines for connecting between the sensor 30 within the package 10 and the circuit portion 70 within the circuit containing portion 71, and extend further to the outside than the metal shields 42. The extension shield portions 80 are each structured from an insulated pipe 81 that covers the outer periphery of the electrode lead pin 41 that is exposed from the shield 42 of the electrode lead portion 40, and a coil spring 82 that covers the outer periphery of the insulated pipe 81.

The electrode lead pin 41 is formed from a metal with thermal durability (for example, a thermally durable nickel alloy such as Inconel® X750, hastelloy, a thermally durable stainless steel such as SUS310S, or the like). The insulated pipe 81 is an insulating member formed from an insulating material (such as alumina, quartz glass, or the like), and fulfills the function of electrically insulating the electrode lead pin 41 and the coil spring 82. The insulated pipe 81 in the present example is formed as a long cylinder having therein a through hole 81a through which the electrode lead pin 41 passes. The coil spring 82 is an elastic member formed from a thermally durable metal (for example, a thermally durable nickel alloy such as Inconel® X750, hastelloy, a thermally durable stainless steel such as SUS310S, or the like), and fulfills a function of providing elasticity and flexibility to the extension shield portion 80. The coil spring 82 may either be a tensile coil spring or a compressive coil spring, and the number of coils and the spacing thereof may be set as appropriate.

The insulated pipe 81 that structures the extension shield portion 80 either abuts an end portion of the shield 42 that structures the electrode lead portion 40, or is bonded thereto through a bonding agent, or the like. Moreover, the coil spring 82 is secured to the insulated pipe 81 through a welding method such as laser welding, resistance welding, or the like, or through a mechanical coupling method, through friction fitting, or the like.

The operation of the pressure sensor device 1 according to the present example is explained next. Note that in the present example, the pressure sensor device 1 is attached in an appropriate location in, for example, a semiconductor manufacturing device, where the operation of the pressure sensor device 1 when measuring an extremely small pressure (hereinafter termed a "micro-pressure") near vacuum in the process gas is explained using a semiconductor manufacturing process, such as CVD (chemical vapor deposition), or the like, as an example.

The process gas is introduced into the package 10 through the pressure inlet hole 11d from the pressure inlet portion 10A of the pressure sensor device 1. At this time, even if the process gas flows in violently, the process gas is caused to follow a circuitous route through the baffle 11c and the pressure inlet holes 11d to flow into the interior of the package 10, so the process gas does not strike the diaphragm 32 directly. This makes it possible to prevent the redeposition of process gas components or of contaminants included in the process gas onto the sensor diaphragm 32.

Note that even though the process gas is at a micro-pressure, the capacitance chamber of the sensor 30 is at vacuum, so the sensor diaphragm 32 flexes, changing the spacing between the stationary electrodes 33b and 33c and the movable electrodes 32b and 32c of the sensor 30. This causes a change in the capacitance value of the capacitor structured by the stationary electrodes 33b and 33c and movable electrodes 32b and 32c, The micro-pressure of the process gas can be measured through reading this change in the capacitance value to the outside of the pressure sensor device 1 through the electrode lead portions 40.

On the other hand, in the present example, the pressure sensor device 1 is installed in a semiconductor manufacturing process, and because the process gases are at a high temperature, there are large thermal differences produced in the part wherein the pressure sensor device 1 is attached before and after the introduction of the process gas into the semiconductor manufacturing equipment. Moreover, the sensor 30 itself undergoes thermal changes because it is used when heated with a heater (to, for example, a maximum of about 200° C.). Moreover, because it is necessary to heat to about 300° C. in the pressure sensor manufacturing step (the final sealing step) when manufacturing the device, the components contained within the package 10 undergo large thermal changes. In this regard, in the case of the pressure sensor device 1 in the present form of embodiment, the package 10 and the circuit containing portion 71 are disposed separately, formed in separate cases, eliminating the need for the special thermal insulating and heat dissipating structures within the device that have been required in the conventional integrated pressure sensor device, making it possible to dispose the package 10 and the circuit containing portion 71 flexibly, depending on the environment of the work area.

In the pressure sensor device 1 according to the present example, as set forth above, the package 10 (the sensor containing portion) and the circuit containing portion 71 are structured. from separate cases and are disposed separately, making it possible to dispose the package 10 and the circuit containing portion 71 flexibly depending on the environment of the work area Moreover, the connecting structural member 90 that connects between the package 10 and the circuit containing portion 71 comprises electrode lead pins 41 that connect between the sensor 30 within the package 10 and the circuit portion 70 within the circuit containing portion 71, insulated pipes 81 that cover the outer peripheries of the electrode lead pins 41, and coil springs 82 the cover the outer peripheries of the insulated pipes 81, and thus has strong mechanical strength and elasticity. Moreover, this type of connecting structural member 90 functions as a heat dissipating member and as an electromagnetic shielding member, This makes it possible to increase the mechanical strength, thermal durability, and electromagnetic shielding and to improve the reliability of the pressure sensor device 1, despite having a simple structure.

Figure 2:
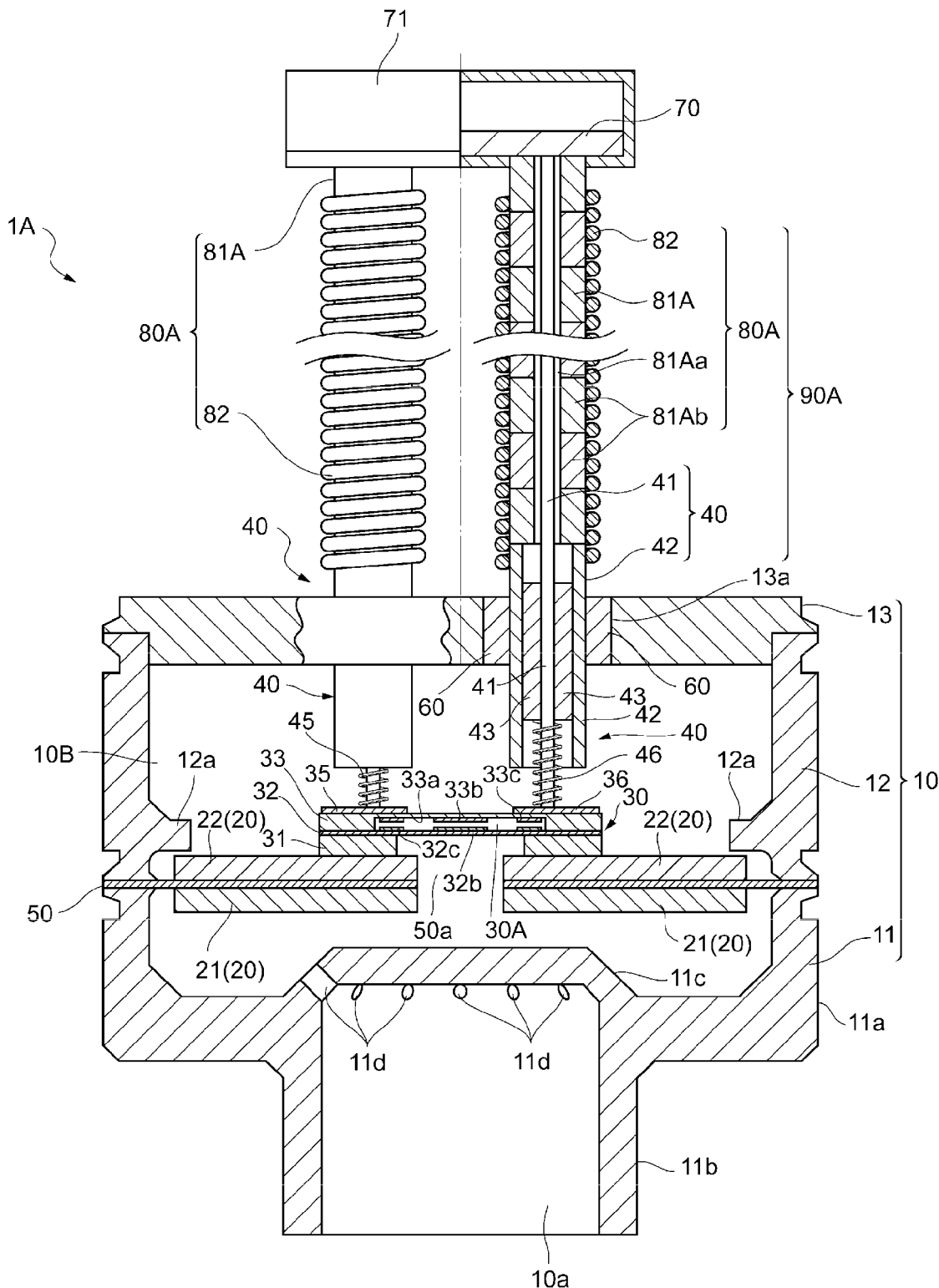
FIG. 2 is a cross-sectional diagram of a pressure sensor device according to another example of the present invention.

FIG. 2 will be used next to explain a pressure sensor device 1A according to another example. The pressure sensor device according to the present example differs only in the structure of the connecting structural member (the extension shield portion) of the pressure sensor device 1A according to the previous example, and the other structures are essentially the same as those in the above example. Because of that, the explanation focuses on the structure that is different, where identical codes as those above are assigned to those structures that are the same, and detailed explanations thereof are omitted.

The connecting structural member 90A in the pressure sensor device 1A according to the present example is structured from the electrode lead portions 40, and an extension shield portion 80A that is connected to the electrode lead portions 40. The extension shield portions 80A are each structured from a pipe-shaped structural member 81A that covers the outer periphery of the electrode lead pin 41 that is exposed from the shield 42 of the electrode lead portion 40, and a coil spring 82 that covers the outer periphery of the pipe-shaped structural member 81A.

The electric the electrode lead pins 41 and coil springs 82 are essentially identical to those above, so explanations thereof will be omitted. As with the insulated pipe 81 in the above example, the pipe-shaped structural member 81A is an insulated member of an elliptical cylindrical shape, and is structured by stacking together, in the lengthwise direction of the electrode lead pin 41, a plurality of elliptical pipe-shaped members 81Ab that are formed from an insulated material (such as alumina, quartz glass, or like). The pipe-shaped structural member 81A has superior flexibility due to being structured from the plurality of short pipe-shaped. members 81Ab. A through hole 81Aa, through which the electrode lead pin 41 passes, is formed within the pipe-shaped structural member 81A.

In the pressure sensor device 1A according to the present example, as set forth above, the package 10 (the sensor containing portion) and the circuit containing portion 71 are structured from separate cases and are disposed separately, making it possible to dispose the package 10 and the circuit containing portion 71 flexibly depending on the environment of the work area. Moreover, the connecting structural member 90A that connects between the package 10 and the circuit containing portion 71 includes electrode lead pins 41 that connect between the sensor 30 within the package 10 and the circuit portion 70 within the circuit containing portion 71, the pipe-shaped structural members 81A that cover the outer peripheries of the electrode lead pins 41, and coil springs 82 the cover the outer peripheries of the pipe-shaped structural members 81A, and thus has strong mechanical strength and elasticity. Moreover, the connecting structural member 90A functions also as a heat dissipating member and as an electromagnetic shield member. Consequently, this enables excellent mechanical strength, thermal durability, and electromagnetic shielding despite having a simple structure, enabling an improvement in the reliability of the pressure sensor device 1A.

Moreover, in the pressure sensor device 1A according to the example set forth above, the connecting structural member 90A is given substantially more flexibility through structuring the pipe-shaped structural member 81A through stacking, in the lengthwise direction of the electrode lead pin 41, a plurality of short pipe-shaped members 81Ab that are formed from an insulating material. Moreover, stacking the plurality of short pipe-shaped members 81Ab makes it possible to form a connecting structural member 90A of an arbitrary length.

Figure 3:
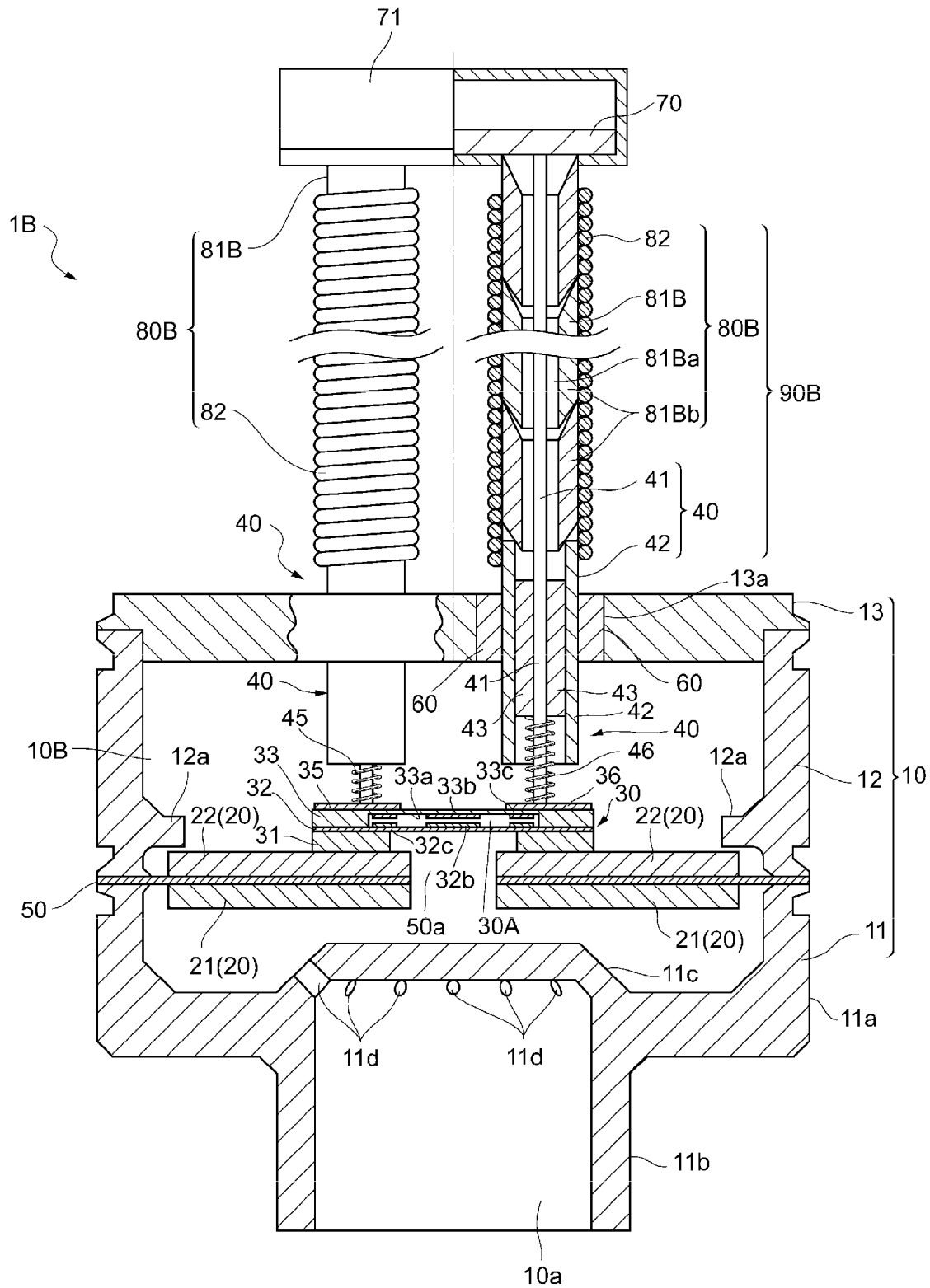
FIG. 3 is a cross-sectional diagram of a pressure sensor device according to a further example of the present invention.

FIG. 3 will be used next to explain a pressure sensor device 1B according to a further example. The pressure sensor device according to the present example differs only in the structure of the connecting structural member (the extension shield portion) of the pressure sensor device 1B according to the above examples, and the other structures are essentially the same as those in the above examples. Because of that, the explanation focuses on the structure that is different, where identical codes as those in the above examples are assigned to those structures that are the same, and detailed explanations thereof will be omitted.

The connecting structural member 90B in the pressure sensor device 1B according to the present form of embodiment is structured from the electrode lead portions 40, and an extension shield portion 80B that is connected to the electrode lead portions 40. The extension shield portions 80B are each structured from a pipe-shaped structural member 81B that covers the outer periphery of the electrode lead pin 41 that is exposed from the shield 42 of the electrode lead portion 40, and a coil spring 82 that covers the outer periphery of the pipe-shaped structural member 81B.

The electric the electrode lead pins 41 and coil springs 82 are essentially identical to those in the above example, so explanations thereof are omitted. As with the insulated pipe 81 in the above example, the pipe-shaped structural member 81B is an insulated member of an elliptical cylindrical shape, and is structured by stacking together, in the lengthwise direction of the electrode lead pin 41, a plurality of elliptical pipe-shaped members 81Bb that are formed from an insulated material (such as alumina, quartz glass, or like). A through hole 81Ba, through which the electrode lead pin 41 passes, is formed within the pipe-shaped structural member 81B. The short pipe-shaped members 81Bb in the present form of embodiment, as illustrated in FIG. 3, are formed with pointed protruding shapes on one end thereof, and recessed shapes, into which the end portions of the protruding shapes can fit, on the other end thereof. The pipe-shaped structural member 81B has superior flexibility due to being structured through fitting together the plurality of short pipe-shaped members 81Bb.

In the pressure sensor device 1B according to the present example, as set forth above, the package 10 (the sensor containing portion) and the circuit containing portion 71 are structured from separate cases and are disposed separately, making it possible to dispose the package 10 and the circuit containing portion 71 flexibly depending on the environment of the work area. Moreover, the connecting structural member 90B that connects between the package 10 and the circuit containing portion 71 comprises electrode lead pins 41 that connect between the sensor 30 within the package 10 and the circuit portion 70 within the circuit containing portion 71, the pipe-shaped structural members 81B that cover the outer peripheries of the electrode lead pins 41, and coil springs 82 the cover the outer peripheries of the pipe-shaped structural members 81B, and thus has strong mechanical strength and elasticity. Moreover, the connecting structural member 90B functions also as a heat dissipating member and as an electromagnetic shield member. Consequently, this enables excellent mechanical strength, thermal durability, and electromagnetic shielding despite having a simple structure, enabling an improvement in the reliability of the pressure sensor device 1B.

Moreover, in the pressure sensor device 1B according to the example set forth above, the connecting structural member 90B is given substantially more flexibility through structuring the pipe-shaped structural member 81B through stacking, in the lengthwise direction of the electrode lead pin 41, a plurality of short pipe-shaped members 81Ab that are formed from an insulating material. Moreover, stacking the plurality of short pipe-shaped members 81Bb makes it possible to form a connecting structural member 90B of an arbitrary length.

Note that while in each of the examples of embodiment set forth above the support diaphragm 50 was made out of Inconel®, there is no particular limitation thereto, but rather it may be made out of a corrosion-resistant metal such as stainless steel or Kovar®, or the like. Moreover, while the pedestal plate 20 and the sensor 30 were made out of sapphire, there is no particular limitation to this material, but rather they may be made out of silicon, alumina, silicon carbide, quartz, or the like. Moreover, while the connecting portion between the contact pads 35 and 36 and the electrode lead portions 40 were structured by forming contact springs 45 and 46, there is no particular limitation thereto, insofar as there is adequate flexibility, and they may instead be formed from leaf springs.

Moreover, the electrode lead portions 40 and contact pads 35 and 36 may instead be connected through an adequately soft electric wire. Moreover, the shapes of the sensor 30, the pedestal plate 20, the electrode lead portion 40, and the package 10 are, of course, not limited to those in the examples set forth above.

The invention claimed is:

1. A pressure sensor device comprising:
   a sensor detecting a pressure of a gas introduced from the outside,
   a heater heating the sensor to a specific operating temperature,
   a package containing the sensor and the heater,
   a circuit portion producing an output signal representing the pressure of the gas, based on the detection output detected by the sensor, and a circuit containing portion containing the circuit portion,
   wherein the package and the circuit containing portion are structured from separate cases and are disposed separately with a connecting structural member interposed therebetween; and
   wherein the connecting structural member comprises:
      a conductive line connecting between the sensor within the package and the circuit portion within the circuit containing portion,
      an insulated member covering the outer periphery of the conductive line, and
      an elastic member covering the outer periphery of the insulated member.

2. The pressure sensor device as set forth in claim 1, wherein:
   the insulated member is structured by layering a plurality of pipe-shaped members, formed from an insulating material, in the lengthwise direction of the conductive line.

3. The pressure sensor device as set forth in claim 1, wherein:
   the elastic member is structured from a coil spring.

* * * * *